US010021436B2

(12) United States Patent
Strein

(10) Patent No.: US 10,021,436 B2
(45) Date of Patent: Jul. 10, 2018

(54) STORAGE OF TAGS IN VIDEO FOR CARRIAGE IN REAL-TIME

(71) Applicant: Disney Enterprises, Inc., Burbank, CA (US)

(72) Inventor: Michael Strein, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 662 days.

(21) Appl. No.: 14/514,242

(22) Filed: Oct. 14, 2014

(65) Prior Publication Data

US 2016/0105694 A1   Apr. 14, 2016

(51) Int. Cl.
*H04N 7/173* (2011.01)
*H04N 21/235* (2011.01)
*H04N 21/2187* (2011.01)
*H04N 21/854* (2011.01)
*H04N 21/84* (2011.01)

(52) U.S. Cl.
CPC ..... *H04N 21/2353* (2013.01); *H04N 21/2187* (2013.01); *H04N 21/84* (2013.01); *H04N 21/854* (2013.01)

(58) Field of Classification Search
CPC ........... H04N 21/2143; H04N 21/2353; H04N 21/2187; H04N 21/854; H04N 21/84
See application file for complete search history.

(56) References Cited

U.S. PATENT DOCUMENTS

| 2009/0235311 | A1* | 9/2009 | Michel | H04N 21/235 725/40 |
| 2012/0124232 | A1* | 5/2012 | Kim | H04N 21/2343 709/231 |
| 2013/0246077 | A1* | 9/2013 | Riedmiller | G10L 19/008 704/500 |
| 2013/0311780 | A1* | 11/2013 | Besehanic | H04L 9/3247 713/176 |

OTHER PUBLICATIONS

SMPTE 334M-200 Vertical Ancillary Data Mapping for Bit-Serial Interface; May 12, 2000.*
SMPTE RP 207-2005 Transport of Program Description Data in Vetical Ancillary Data Packets; Mar. 22, 2005.*

* cited by examiner

*Primary Examiner* — John Schnurr
(74) *Attorney, Agent, or Firm* — Farjami & Farjami LLP

(57) ABSTRACT

There is provided a system and method for storing tags in video for carriage in real-time. The system comprising a content creator and a television network, the content creating configured to retrieve a video from a memory for delivery to the television network, generate an ID3 tag for the video, the ID3 tag including information about the video, insert the ID3 tag into a vertical ancillary data (VANC) space of the video, and transmit the video including the ID3 tag to the television network. The television network configured to receive the video including the ID3 tag from the content creator and transmit the video including the ID3 tag to a display device.

11 Claims, 5 Drawing Sheets

STORAGE OF TAGS IN VIDEO FOR CARRIAGE IN REAL-TIME

BACKGROUND

Metadata containers are often used to provide information about the files they represent, such as audio or video files. For example, ID3 Tags allow information such as the title, artist, album, track number, and other information about the file to be stored within the file itself. However, problems can occur with the ID3 Tags when the files are streamed in baseband for, for example, not as a compressed stream. For instance, when files are streamed in baseband form, the ID3 Tags are lost.

Methods have been developed to try and preserve the ID3 Tags in files that are streamed in baseband form. For example, one method tries to preserve the ID3 tags using watermarking. However, ID3 Tags are not viable for watermarking, since ID3 Tags are often long, such as 128 bytes or 227 bytes.

SUMMARY

The present disclosure is directed to a system and method for the storing of tags in video for carriage in real-time, substantially as shown in and/or described in connection with at least one of the figures, as set forth more completely in the claims.

DETAILED DESCRIPTION

Figure 1:
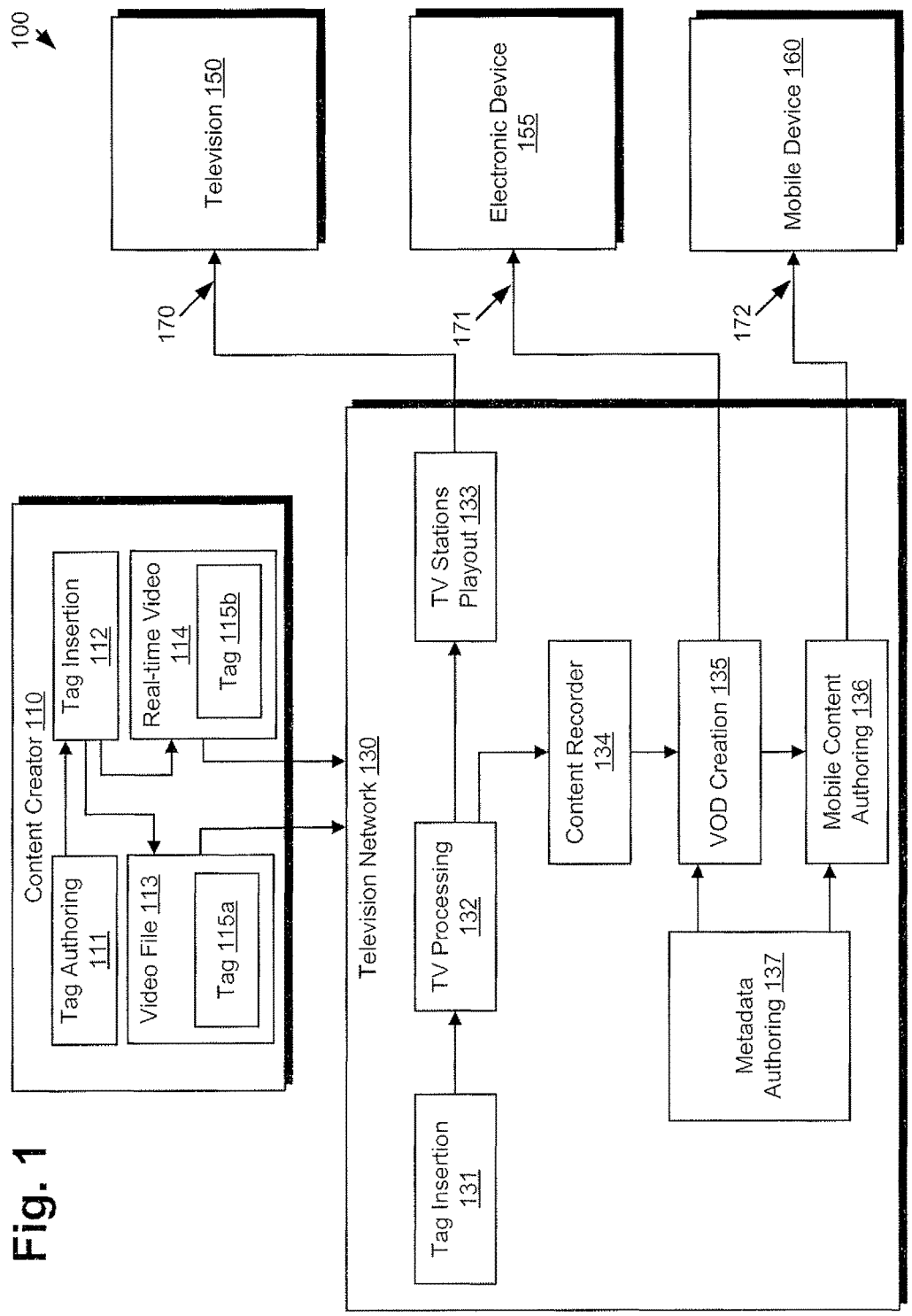
FIG. 1 presents a system used for the storing of tags in video for carriage in real-time, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system used for the storing of tags in video for carriage in real-time, according to one implementation of the present disclosure. System 100 of FIG. 1 includes content creator 110, television network 130, television 150, electronic device 155, and mobile device 160. Content creator 110 includes tag authoring 111, tag insertion 112, video file 113, and real-time video 114. Video file 113 includes tag 115a and real-time video 114 includes tag 115b. Television network 130 includes tag insertion 131, television (TV) processing 132, TV stations playout 133, content recorder 134, video on demand (VOD) creation 135, mobile content authoring 136, and metadata authoring 137. System 100 further includes transmission link 170, transmission link 171, and transmission link 172.

As illustrated in FIG. 1, content creator 110 authors and inserts tags into video content before transmitting the video content to television network 130. Content creator 110 may include any entity that creates the video content that is transmitted to television network 130. For example, content creator 110 may include, but is not limited to, a Post Production House or Television Studio that created both video file 113 and/or real-time video 114. Video file 113 may include any type of video data that is encoded and compressed into a video format for transmission to television network 130. Real-time video 114 may include any type of video or live feed that is transmitted to and ready to be played out by television network 130.

As illustrated in of FIG. 1, content creator 110 creates and inserts the tags into the video content using tag authoring 111 and tag insertion 112. Tag authoring 111 may be used by content creator 110 to generate tags for insertion into video content, such as tag 115a inserted into video file 113 and tag 115b inserted into real-time video 114. Tags 115a and 115b may include ID3 tags that provide information about the video content. For example, tag 115a may include a metadata container that provides information about video file 113, such as, but not limited to, the title of video file 113, how video file 113 was created, and the length of video file 113. For another example, tag 115b may include a metadata container that provides information about real-time video 114, such as, but not limited to, the title of real-time video 114 and how real-time video 114 was created. ID3 tags provide the Title, Artist, Year, Genre and other information about the media file they represent, whether an audio file or a video file. An ID3 tag is a data container within a media file stored in a prescribed format. This data commonly contains, among other things, the Artist names, Title, Year and Genre of the media file.

After creating ID3 tags using tag authoring 111, content creator 110 then uses tag insertion 112 to insert the created tags into the video content itself. For example, and as illustrated in FIG. 1, tag insertion 112 may insert tag 115a into video file 113. In such an example, tag insertion 112 may insert tag 115a into video file 113 using a number of different method such as, but not limited to, in the header of video file 113, at the end of video file 113, or as a sidecar file to video file 113. For another example, and as also illustrated in FIG. 1, tag insertion 112 may insert tag 115b into real-time video 114. In such an example, tag insertion 112 may insert tag 115b into the vertical ancillary data (VANC) space of real-time video 114.

Ancillary data (commonly abbreviated as ANC data), in the context of television systems, refers to a means which by non-video information (such as audio, other forms of essence, and metadata) may be embedded within the serial digital interface. Ancillary data is standardized by SMPTE as *SMPTE 291M: Ancillary Data Packet and Space Formatting*, which is incorporated herein by reference. Ancillary data can be located in non-picture portions of horizontal scan lines. This is known as horizontal ancillary data (HANC). Ancillary data can also be located in non-picture regions of the frame. This is known as vertical ancillary data (VANC). Data is stored in the VANC by referencing Data ID's (DIDs) and Secondary Data ID's (SDIDs). SMPTE 291M allows an availability of DID/SDID combinations for user defined functions. SMPTE 291M is used for insertion of data into HDTV signals. There are also SMPTE standards for SDTV as well as UHDTV formats that may be used in various implementations disclosed herein.

Continuing with FIG. 1, by having content creator 110 create and insert the tags into the video content before transmitting the video content to television network 130, the tags are preserved in the video content. As such, the tags are not lost when the video content is streamed in baseband form. For example, tag 115b will not be lost when real-time video 114 is streamed in baseband form. Furthermore, television network 130 does not have to generate and insert tags into the video content as the video content includes the tags when received from content creator 110.

After receiving the video content from content creator 110, such as video file 113 and real-time video 114, television network 130 then processes the video content so that the video content can be transmitted to and played out as video by television 150, electronic device 155, and mobile device 160. In order to process the video content, television network 130 first uses tag insertion 131 to insert tags into any video that does not already include tags. For example, if television network 130 is processing video file 113 using tag insertion 131, television network 130 would take tag 115a from video file 113 and insert tag 115a into the video for playout. In such an example, television network 130 may insert tag 115a into the VANC space of the video. For another example, if television network 130 is processing real-time video 114 using tag insertion 131, television network 130 would not have to do anything to real-time video 114 since real-time video 114 includes a video or live feed with tag 115b already inserted in the VANC space.

Also illustrated in FIG. 1, television network 130 includes TV processing 132. Television network 130 uses TV processing 132 to further process video for playout to television 150, electronic device 155, and mobile device 160. For example, television network 130 may process real-time video 114 using TV processing 132 by inserting TV ratings, captions, and other information into real-time video 114.

As shown in FIG. 1, television network 130 includes TV stations playout 133. Television network 130 may utilize TV stations playout 133 to playout the video (such as real-time video 114) to television 150, where television 150 includes a home television of a user watching the video. For example, television network 130 may use TV stations playout 133 to transmit real-time video 114 to television 150 using transmission link 170. In one implementation, transmission link 170 corresponds to television network 130 transmitting real-time video 114 to a television station (not shown). In such an implementation, the television station would then transmit real-time video 114 to television 150. However, in another implementation, transmission link 170 corresponds to television network 130 directly transmitting real-time video 114 to television 150.

Television network 130 includes content recorder 134. Television network 130 may utilize content recorder 134 to record everything that gets aired on television network 130, such as real-time video 114. By recording everything that gets aired on television network 130 using content recorder 134, television network 130 is able to capture TV ratings data, such as those inserted by Nielsen and Arbitron. For example, television network 130 may use content recorder 134 to capture C3 ratings (or eventually C7 ratings, which are ratings data collected post real-time viewing) using tag 115a from video file 113 and tag 115b from real-time video 114.

As illustrated in FIG. 1, television network 130 includes VOD creation 135. Television network 130 may utilize VOD creation 135 to transmit videos to electronic device 155, where electronic device 155 includes any device capable of playing VOD content, such as, but not limited to, a television or set-top box. For example, television network 130 may utilize VOD creation 135 to transmit real-time video 114 including tag 115b to electronic device 155 using transmission link 171. In such an example, television network 130 may use VOD creation 135 to stream the real-time video 114 including tag 115b to electronic device 155 if electronic device 155 is a set-top box or a computer, where the streaming of real-time video 114 corresponds to transmission link 171. Furthermore, television network 130 may use VOD creation 135 to allow electronic device 155 to download real-time video 114 including tag 115b if electronic device is a computer, digital video recorder, or portable media player, where the downloading of real-time video 114 corresponds to transmission link 171.

Television network 130 includes mobile content authoring 136. Television network 130 may utilize mobile content authoring 136 to generate the packaging that is needed for delivering video to mobile device 160, where mobile device 160 includes a mobile phone. When generating the packaging for mobile device 160, mobile content authoring 136 would process the tags within the video to create a different carrying format for the tags for delivery to mobile device 160. For example, mobile content authoring 136 may processes real-time video 114 that includes tag 115b stored in the VANC space of real-time video 114 to generate a video file for mobile device 160. In such an example, mobile content authoring 136 may take tag 115b from the VANC space of real-time video 114 and place tag 115b in the header of the video file, at the end of the video file, or as a separate element that gets transmitted with the video file.

Also, television network 130 may utilize mobile content authoring 136 to transmit the video file including the tag to mobile device 160 using transmission link 172. For example, in one implementation, television network 130 may utilize mobile content authoring 136 to transmit the video file to mobile device 160 using over-the-top services, where the over-the-top services correspond to transmission link 172. For another example, in another implementation, television network 130 may utilize mobile content authoring 136 to transmit the video file to mobile device 160 using content delivery networks, where in content delivery networks correspond to transmission link 172.

It should be noted that, in one implementation, television network 130 may further utilize metadata authoring 137 to generate tags for videos that are transmitted to mobile device 160 when the videos do not already include tags generated by content creator 110. In such an implementation, mobile content authoring 136 would insert the tags generated by metadata authoring 137 into the video files similarly to how mobile content authoring 136 inserts tag 115b the video file discussed above.

Figure 2:
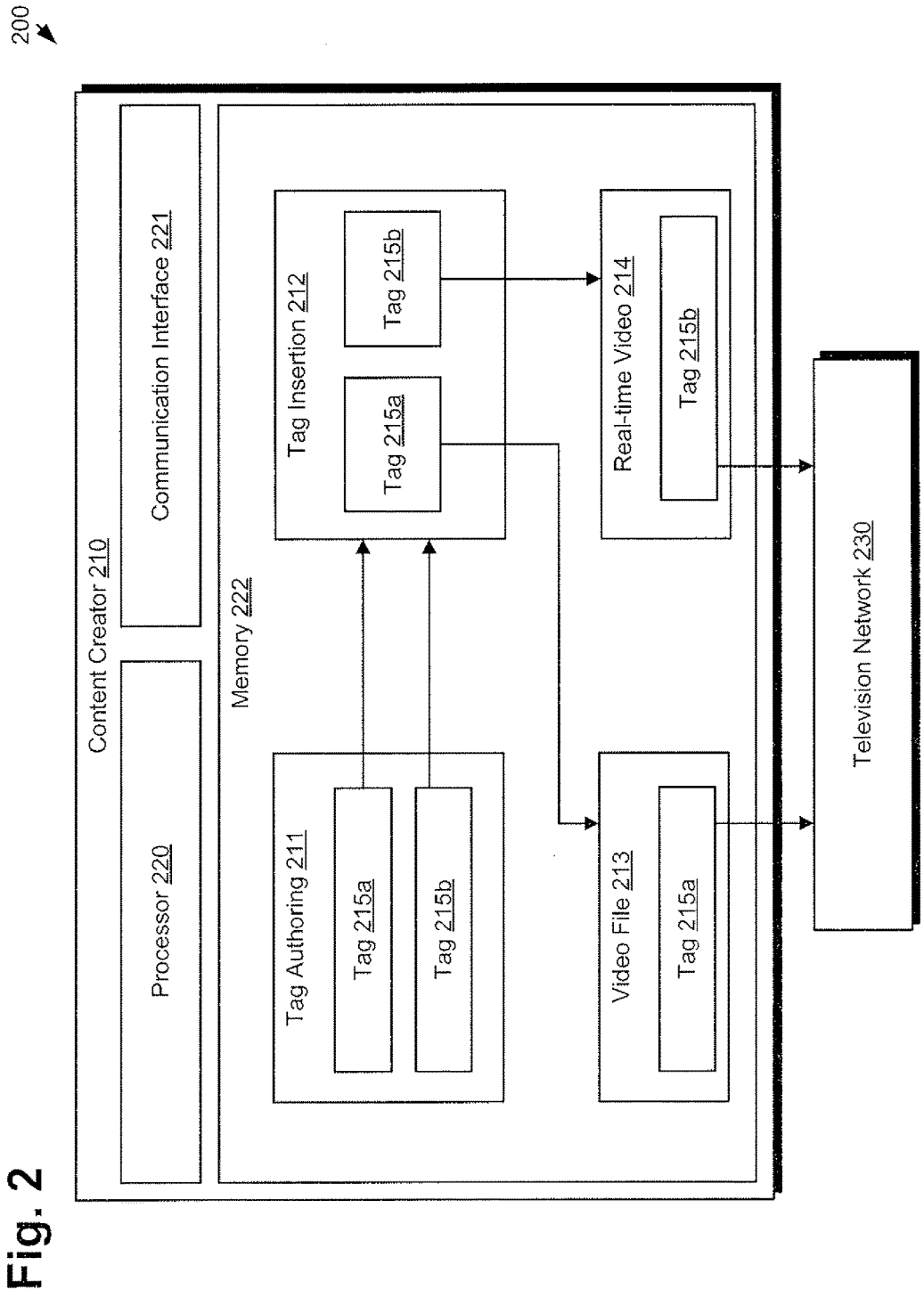
FIG. 2 presents an example of a content creator storing tags in video for carriage in real-time, according to one implementation of the present disclosure.

FIG. 2 presents an example of a content creator storing tags in video for carriage in real-time, according to one implementation of the present disclosure. System 200 of FIG. 2 includes content creator 210 and television network 230. Content creator 210 includes processor 220, communication interface 221, and memory 222. Memory 222 includes tag authoring 211, tag insertion 212, video file 213, and real-time video 214. Tag authoring 211 includes tag 215a and tag 215b. Tag insertion 212 includes tag 215a and tag 215b. Video file 213 includes tag 215a. Real-time video 214 includes tag 215b.

With regard to FIG. 2, it should be noted that content creator 210, tag authoring 211, tag insertion 212, video file 213, real-time video 214, tag 215a, tag 215b, and television network 230 correspond respectively to content creator 110, tag authoring 111, tag insertion 112, video file 113, real-time video 114, tag 115a and tag 115b from FIG. 1.

As illustrated in FIG. 2, content creator 210 includes processor 220 and memory 222. Processor 220 may be configured to access memory 222 to store received input or to execute commands, processes, or programs stored in memory 222, such as tag authoring 211 and tag insertion 212. Processor 220 may correspond to a processing device, such as a microprocessor or similar hardware processing device, or a plurality of hardware devices. Memory 222 is a sufficient memory capable of storing commands, processes, and programs for execution by processor 220.

In the implementation of FIG. 2, content creator 210 utilizes tag authoring 211 to generate tag 215a for video file 213 and tag 215b for real-time video 214. After generating tag 215a and tag 215b, content creator 210 then utilizes tag insertion 212 to insert tag 215a into video file 213 and tag 215b into real-time video 214. For example, and as discussed above, tag insertion 212 may insert tag 215a into the header of video file 213, at the end of video file 213, or as a sidecar file to video file 213. For another example, and also discussed above, since real-time video 214 includes a video or live feed, tag insertion 212 may insert tag 215b into the VANC space of real-time video 214.

Continuing with FIG. 2, after inserting tag 215a into video file 213 and tag 215b into real-time video 214, content creator 210 transmits video file 213 including tag 215a and real-time video 214 including tag 215b to television network 230 using communication interface 221. For example, communication interface 221 may utilize an wired or wireless technologies for transmitting video file 213 and real-time video 214 to television network 230.

Figure 3:
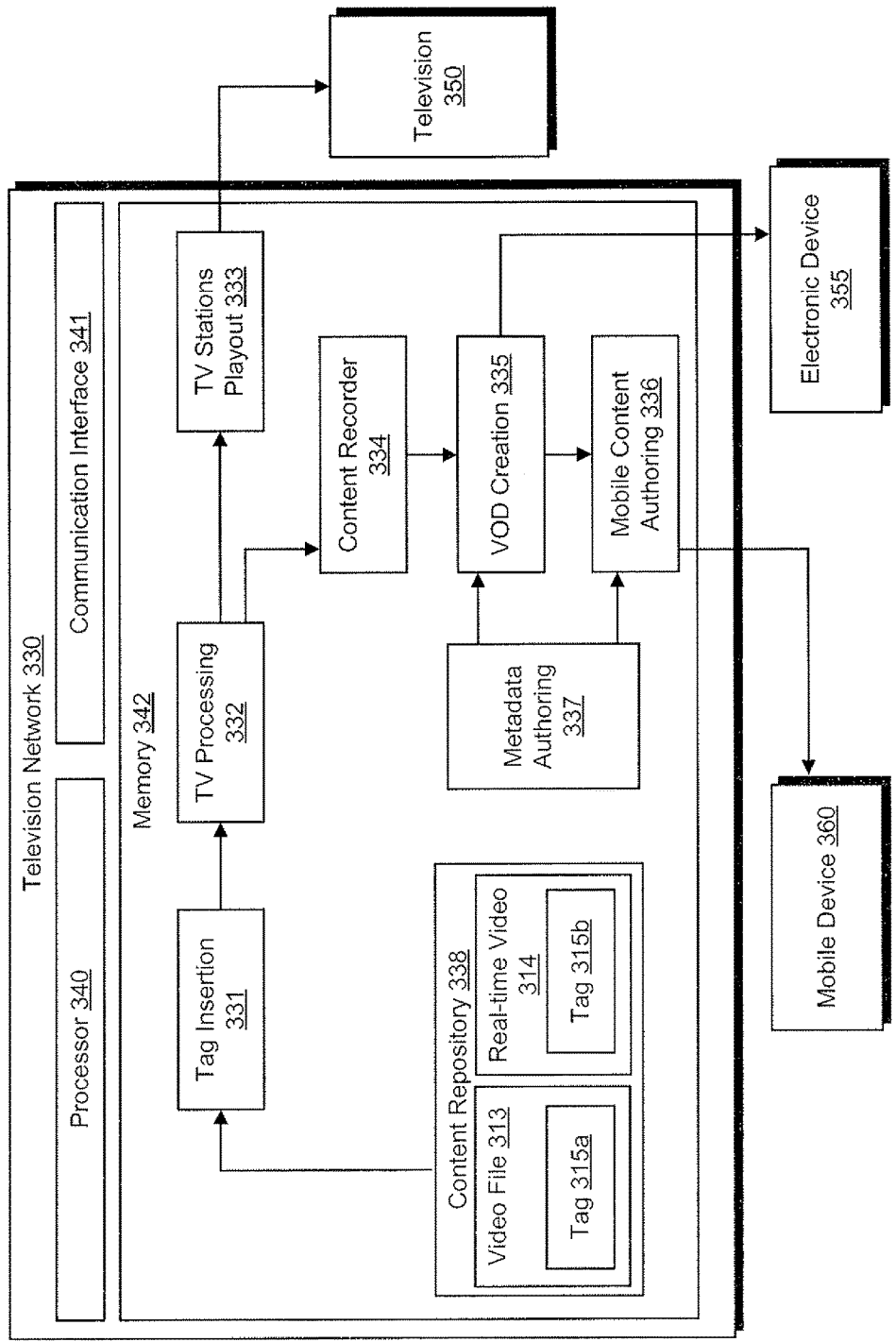
FIG. 3 presents an example of a television network utilizing video that includes stored tags, according to one implementation of the present disclosure.

FIG. 3 presents an example of a television network utilizing video that includes stored tags, according to one implementation of the present disclosure. System 300 of FIG. 3 includes television network 330, television 350, electronic device 355, and mobile device 360. Television network 330 includes processor 340, communication interface 341, and memory 342. Memory 343 tag insertion 331, TV processing 332, TV stations playout 333, content recorder 334, VOD creation 335, mobile content authoring 336, metadata authoring 337, and content repository 338. Content repository 338 includes video file 313 and real-time video 314. Video file 313 includes tag 315a. Real-time video 314 includes tag 315b.

With regard to FIG. 3, it should be noted that video file 313, real-time video 314, tag 315a, tag 315b, television network 330, tag insertion 331, TV processing 332, TV stations playout 333, content recorder 334, VOD creation 335, mobile content authoring 336, metadata authoring 337, television 350, electronic device 355, and mobile device 360 correspond respectively to video file 113, real-time video 114, tag 115a, tag 115b, television network 130, tag insertion 131, TV processing 132, TV stations playout 133, content recorder 134, VOD creation 135, mobile content authoring 136, metadata authoring 137, television 150, electronic device 155, and mobile device 160 from FIG. 1.

As illustrated in FIG. 3, television network 330 includes processor 340 and memory 342. Processor 340 may be configured to access memory 342 to store received input or to execute commands, processes, or programs stored in memory 342, such as tag insertion 331, television processing 332, TV stations playout 333 content recorder 334, VOD creation 335, mobile content authoring 336, metadata authoring 337, and content repository 338. Processor 340 may correspond to a processing device, such as a microprocessor or similar hardware processing device, or a plurality of hardware devices. Memory 342 is a sufficient memory capable of storing commands, processes, and programs for execution by processor 340.

As shown in FIG. 3, television network 330 includes content repository 338. Television network 330 may utilize content repository 338 to store video content received from a content creator, such as video file 313 and real-time video 314. For example, and using FIG. 1, television network 130 may store video file 113 and real-time video 114 received from content creator 110 in content repository 338. Television network 330 may then process that stored video content from content repository 338 using the methods described above. Finally, television network 330 may transmit the processed video using communication interface 341 to television 350, electronic device 355, and mobile device 360, where communication interface 341 utilizes any wired or wireless technology.

Figure 4:
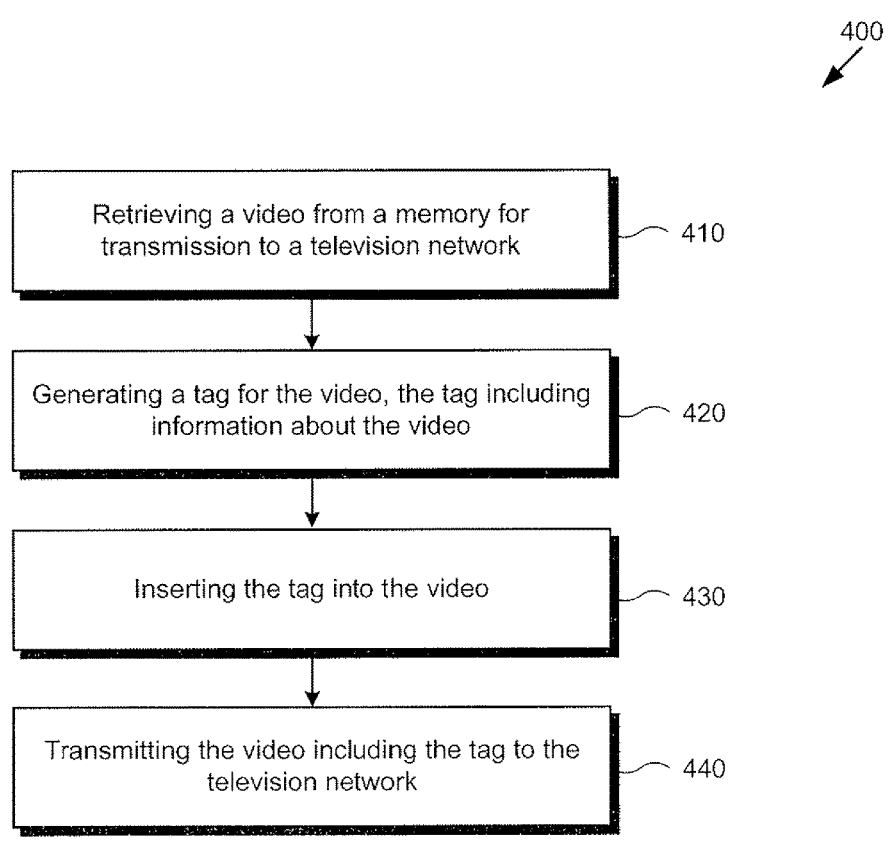
FIG. 4 presents flowchart illustrating a method for a content creator to store tags in video for carriage in real-time, according to one implementation of the present disclosure.

FIG. 4 presents flowchart illustrating a method for a content creator to store tags in video for carriage in real-time, according to one implementation of the present disclosure. The approach and technique indicated by flowchart 400 are sufficient to describe at least one implementation of the present disclosure, however, other implementations of the disclosure may utilize approaches and techniques different from those shown in flowchart 400. Furthermore, while flowchart 400 is described with respect to FIG. 2, the disclosed inventive concepts are not intended to be limited by specific features shown and described with respect to FIG. 2. Furthermore, with respect to the method illustrated in FIG. 4, it is noted that certain details and features have been left out of flowchart 400 in order not to obscure the discussion of inventive features in the present application.

Referring now to flowchart 400 of FIG. 4, flowchart 400 (at 410) includes retrieving a video from a memory for transmission to a television network. For example, processor 220 of content creator 210 may retrieve video file 213 or real-time video 214 from memory 222 for transmission to television network 230. As discussed above, video file 213 may include any type of video data that is encoded and compressed into a video format for transmission to television network 230. Real-time video 214 may include any type of video or live feed that is transmitted to and ready to be played out by television network 230.

Flowchart 400 (at 420) continues with generating a tag for the video, the tag including information about the video. For example, processor 220 of content creator 210 may utilize tag authoring 211 to generate tag 215a for video file 213 or tag 215b for real-time video 214, where tag 215a includes information about video file 213 and tag 215b includes information about real-time video 214. As discussed above, tags 215a and 215b may each include ID3 tags, which include metadata containers that provide information about the video content.

Flowchart 400 (at 430) continues with inserting the tag into the video. For example, processor 220 of content creator 210 may utilize tag insertion 212 to insert tag 215a into video file 213 or tag 215b into real-time video 214. As discussed above, tag insertion 212 may insert tag 215a into the header of video file 213, at the end of video file 213, or as a sidecar file to video file 213. Furthermore, tag insertion 212 may insert tag 215b into the VANC space of real-time video 214.

Flowchart 400 (at 440) continues with transmitting the video including the tag to the television network. For example, processor 220 of content creator 210 may transmit video file 213 including tag 215a or real-time video 214 including tag 215b to television network 230. As discussed above, television network 230 may then broadcast video file 213 including tag 215a or real-time video 214 including tag 215b to a display device, such as a television or mobile device of a user.

Figure 5:
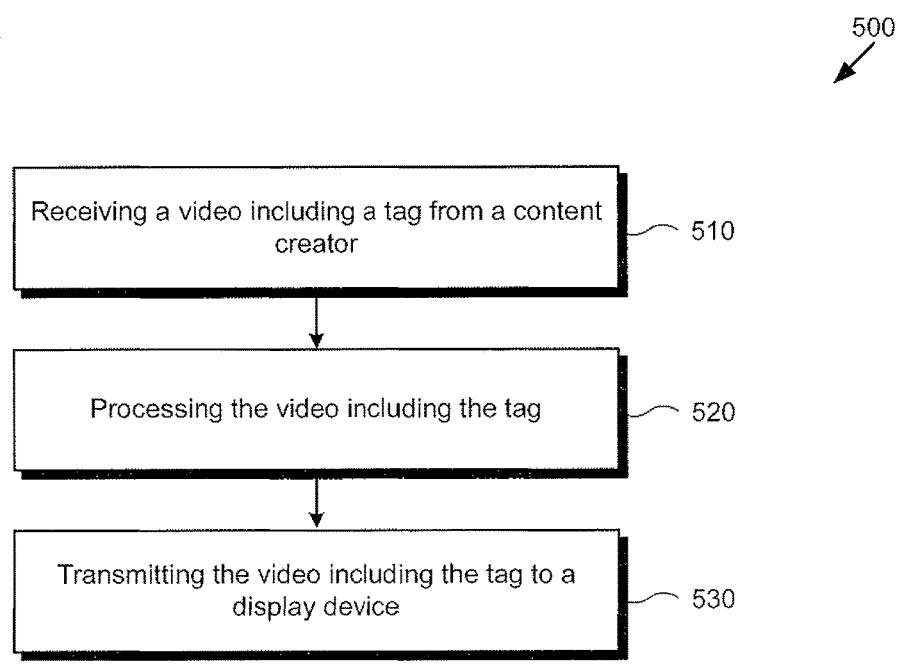
FIG. 5 shows a flowchart illustrating a method for a television network to utilize video that includes stored tags, according to one implementation of the present disclosure.

FIG. 5 shows a flowchart illustrating a method for a television network to utilize video that includes stored tags, according to one implementation of the present disclosure. The approach and technique indicated by flowchart 500 are sufficient to describe at least one implementation of the present disclosure, however, other implementations of the disclosure may utilize approaches and techniques different from those shown in flowchart 500. Furthermore, while flowchart 500 is described with respect to FIG. 3, the disclosed inventive concepts are not intended to be limited by specific features shown and described with respect to FIG. 3. Furthermore, with respect to the method illustrated in FIG. 5, it is noted that certain details and features have been left out of flowchart 500 in order not to obscure the discussion of inventive features in the present application.

Referring now to flowchart 500 of FIG. 5, flowchart 500 (at 510) includes receiving a video including a tag from a content creator. For example, processor 340 of television network 330 may receive video file 313 including tag 315a or real-time video 314 including tag 315b from a content creator, such as content creator 210 from FIG. 2. As discussed above, tag 315a may be inserted in the header of video file 313, at the end of video file 313, or as a sidecar file to video file 313. Furthermore, tag 315b may be inserted in the VANC space of real-time video 314.

Flowchart 500 (at 520) continues with processing the video including the tag. For example, processor 340 of television network 330 may utilize tag insertion 331 to process video file 313 including tag 315a or real-time video 314 including tag 315b. As discussed above, processing video file 313 including tag 315a using tag insertion 331 may include processing video file 313 into a video stream and inserting tag 315a into the VANC space of the video stream. Furthermore, processing real-time video 314 including tag 315b using tag insertion 331 may merely include passing real-time video 314 including tag 315b through tag insertion 331 since real-time video 314 already includes tag 315b inserted in the VANC space of real-time video 314.

Flowchart 500 (at 530) continues with transmitting the video including the tag to a display device. For example, processor 340 of television network 330 may transmit the processed video file 313 including tag 315a or the processed real-time video 314 including tag 315b to a display device. For example, television network 330 may transmit real-time video 314 including tag 315b to television 350.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A television network comprising:
   a processor configured to:
      receive a video including an ID3 tag from a content creator, wherein the ID3 tag is inserted in a vertical ancillary data (VANC) space of the video;
      extract the ID3 tag from the VANC space of the video;
      insert the extracted ID3 tag into a video file formatted for a mobile device; and
      transmit the video file including the ID3 tag to the mobile device.

2. The television network of claim 1, wherein the ID3 tag includes a metadata container that includes information about the video.

3. The television network of claim 2, wherein the information about the video includes at least one of a name of the video, a genre of the video, and how the video was created.

4. The television network of claim 1, wherein the video includes a live feed.

5. A method comprising:
   receiving a video including an ID3 tag from a content creator, wherein the ID3 tag is inserted in an ancillary data (ANC) space of the video;
   extracting the ID3 tag from the ANC space of the video;
   inserting the extracted ID3 tag into a video file formatted for a mobile device; and
   transmitting the video file including the ID3 tag to the mobile device.

6. The method of claim 5, wherein the video is a live feed.

7. The method of claim 6, wherein the live feed including the ID3 tag inserted in the ANC space of the live feed.

8. The method of claim 5, wherein the ID3 tag includes a metadata container that includes information about the video.

9. The method of claim 8, wherein the information about the video includes at least one of a name of the video, a genre of the video, and how the video was created.

10. The method of claim 5, wherein the ANC space is a vertical ancillary data (VANC) space of the video.

11. The method of claim 5, wherein the ANC space is a horizontal ancillary data (HANC) space of the video.

* * * * *